| United States Patent [19] | [11] Patent Number: 4,677,158 |
| Tso et al. | [45] Date of Patent: Jun. 30, 1987 |

[54] PAINT THICKENER

[75] Inventors: Su C. Tso, Louisville; Gary W. Beall, Fairfield; Mary C. Holthouser, Louisville, all of Ky.

[73] Assignee: United Catalysts Inc., Louisville, Ky.

[21] Appl. No.: 796,844

[22] Filed: Nov. 12, 1985

[51] Int. Cl.[4] .............................................. C08L 75/04
[52] U.S. Cl. ................................... 524/789; 106/287.1; 252/313.2; 524/790; 524/445; 524/446; 524/447
[58] Field of Search ............... 524/789, 790, 445, 446, 524/447; 106/287.1, DIG. 4; 252/313.2, 315.2

[56] References Cited

U.S. PATENT DOCUMENTS

| 3,298,849 | 1/1967 | Dohman et al. | 106/288 B |
| 4,391,637 | 7/1983 | Wordis et al. | 524/236 |
| 4,412,018 | 10/1983 | Finlayson et al. | 524/445 |

*Primary Examiner*—Maurice J. Welsh
*Attorney, Agent, or Firm*—Edward M. Steutermann

[57] ABSTRACT

A process whereby a smectite clay having a cationic exchange capacity of at least 50 meq./100 gm of clay is reacted with a quaternary ammonium compound to yield a cationic structure suitable as a thickener for aqueous suspensions, particularly latex paints and caulks. The general structure of the quaternary ammonium compound is typically a nitrogen atom bonded to four separated carbon chains where one chain can be a methyl or alkyl group containing 10 to 22 carbons, and the second chain an alkyl group containing from 10 to 22 carbons or a polyoxyethylene chain. The third and fourth chains are polyoxyethylene chains where the total munber of ethylene oxide units is from 5 to 200 moles.

10 Claims, No Drawings

PAINT THICKENER

BACKGROUND OF THE INVENTION

The invention relates to organophilic clay complexes capable of suspending materials and imparting thixotropic properties to aqueous coating systems such as latex paints and caulks.

Rheological agents are added to thicken aqueous systems and to produce thixotropic flow characteristics for proper brush, roller or spray applications. Prior art thickening agents for aqueous systems possessed various defects which are overcome by compositions and processes within the scope of the present invention.

These thickening agents included many organic polymers such as hydroxyethyl cellulose, carboxymethyl cellulose, quar gum or acid containing polyacrylates, partially hydrolyzed polyvinyl acetate, polyvinyl pyrolidone etc. In the last decade, numerous water soluble synthetic polymers known as associative thickeners have been introduced to coating composition for controlling application properties. These thickeners are polymers with water soluble backbone containing long chain hydrophobic pendants. U.S. Pat. Nos. 4,077,028 and 4,426,485 describe thickeners of such composition.

However, there are various problems associated with the use of these thickeners. In one form the prior art teaches a high molecular weight hydroxyethyl cellulose used as the thickening agent for latex paints. Hydroxyethyl cellulose is a solid metal material which must be dissolved before addition to the coating system which adds additional cost. Cellulose derivatives are known to have high "low shear viscosity" and low "high shear viscosity"; the fast viscosity recovery causes poor flow and leveling in paint application. In addition the elastic property of cellulose derivatives gives severe roller spatter. Moreover, cellulose derivatives are subject to microbial degradation and thus requiring the addition of preservatives. Preservatives are not only expensive, they are also a cause of enviromental concern.

A second prior process teaches the use of acid contaning polyacrylates as aqueous thickener. This type of thickener is pH dependent, so before the agent will become sufficiently thickened to suspend the mixture, the pH must be carefully adjusted to the basic range.

The third prior process teaches hydrophobicly modified polyurethane or acrylic polymers used as thickening agents. Both the polyacrylates and hydrophobicly modified polymers give improved flow, leveling and roller spatter; however they have poor sag control and poor brush pickup. They are also very expensive.

Finlayson, et al, U.S. Pat. No. 4,412,018 teaches an organophilic clay gellant reacted with a quaternary ammonium, phosphonium or sulfonium compound consisting of alkyl chains and aralkyl chains or mixtures thereof; with each carbon chain consisting of 1 to 22 carbon atoms attached to the specific central element chosen for the cationic compound. However, the use of the aforementioned process is limited to non-aqueous systems, contrary to the present invention.

Mardis et al U.S. Pat. No. 4,391,637 teaches an organophilic clay reacted with a quaternary ammonium compound containing a first chain consisting of a beta, gamma, unsaturated alkyl group or a hydroxalkyl group having 2 to 6 carbon atoms; a second member containing a long chain alkyl consisting of 12 to 60 carbon atoms; and a third and fourth member, each consisting of aralkyl and alkyl or combination thereof containing 1 to 22 carbon atoms for use in non-aqueous systems.

Dohman, et. al. U.S. Pat. No. 3,298,849 describes the use of alkanolamine salt modified clay in the formulation of aqueous base paint to increase hydration rate and control rheological properties.

No prior art method or composition is known utilizing organoclay made by a polyether substituted quaternary ammonium compound as a rheological additive in aqueous paint systems.

SUMMARY OF THE INVENTION

The processes and compositions within the scope of the present invention have been unexpectedly found to produce agents which can be used to thicken aqueous coating systems, for example, latex paints and caulks.

Further, the new processes and products have many advantages over other prior art methods and compositions in that they are not subject to microbial degradation that has been found to occur in the previously described cellulose systems.

Further, components within the scope of the present invention give products in slurry form which can be easily dispersed at low shear, for example, during the "let down" stage of latex paint preparation. Processes within the scope of the present invention are not pH sensitive as are many of the other prior art thickeners, thus, eliminating the pH adjustment needed in the prior art procedures.

Briefly the present invention provides a process whereby a smectite clay having a cationic exchange capacity of at least 50 meq./100 gm of clay is reacted with a quaternary ammonium compound to yield a cationic structure suitable as a thickener for aqueous suspensions particularly latex paints and caulks. The general structure of the quaternary ammonium compound is typically a nitrogen atom bonded to four separated carbon chains, one chain being a methyl or alkyl group containing 10 to 22 carbons and the second chain an alkyl group containing from 10 to 22 carbons or a polyoxyethylene chain where the third and fourth chains are polyoxyethylene chains were the total number of ethylene oxide units is from 5 to 200 moles.

DETAILED DESCRIPTION OF THE INVENTION

In general, in accordance with the present invention, it has been found that certain organoclays can be utilized to modify the rheological characteristics of aqueous coating systems where the organoclays are formed by reaction of a smectite clay with a quaternary ammonium compound represented as follows:

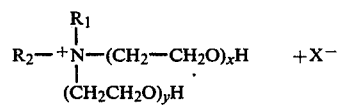

Where $R_1$ is methyl or a $C_{10}$ to $C_{22}$ carbon chain, $R_2$ is $C_{10}$–$C_{22}$ carbon chain or polyoxyethylene chain, $(CH_2\text{-}CH_2O)_zH$, with z reapeating unit where $x+y+z=5$ to 200. $X^-$ is a suitable anion, for example bromine, sulfate, acetate, chloride etc. The quaternary ammonium compound has been found to be effective when added to the clay at 30 to 130 meq. wt./100 gm clay. The organophilic clay can be prepared by admixing the clay, quaternary ammonium compound and water together, preferably at a temperature within the range of from 40° C.–95° C. and more preferably from 60° C. to 90° C. 140° F. (60° C.) to 170° F. (77° C.) for a period of time sufficient for the organic quaternary ammonium compound to react with the clay particles.

Preferably, the clay is dispersed in water at a concentration from about 5% to 12% by weight and, the slurry is centrifuged to remove non-clay impurities. The slurry is then agitated and heated to a temperature in the range of from 60° C. to 90° C.; and the quaternary ammonium salt added in the desired milliequivalent ratio, preferably as a liquid in isopropanol or dispersed in water. The agitation is continued to effect the reaction.

The amount of the quaternary ammonium compound added to the clay for purposes of this invention must be sufficient to impart to the clay the enhanced dispersion characteristics desired. The milliequivalent ratio is defined as the number of milliequivalents of the quaternary ammonium compound, per 100 grams of clay, 100% active basis. The organophilic clays of this invention have a milliequivalent ratios of from 10 to 150. At lower milliequivalent ratios the organophilic clays will cause pigment flocculation. At higher milliequivalent ratios, the organophilic clays are poor thickeners. However, the preferred milliequivalent ratio within the range of from 30 to 100 will vary depending on the characteristics of the quaternary ammonium compound and the aqueous system to be used. The organophilic clay thickener is employed in amounts sufficient to obtain the desired rheological properties for application as to control sagging of fluid films and prevent settling and hard packing of pigments present in the fluid compositions. Amounts of the organophilic clay thickener employed in a typical latex paint are from 5 lb. to 15 lb./100 gal. depending on the particular formulation.

The resulting organophilic clay is then added to the paint system to provide thickening as described hereinafter.

The following examples are given to illustrate the invention, but are not deemed to be limiting thereof.

EXAMPLE 1

One thousand grams of a 6.3% slurry of Wyoming bentonite in water which had been previously treated by centrifugation to remove all non-clay impurities was heated to about 75° C. To the clay slurry, 56.6 gm of methyl, coco-di(polyoxyethylene) quaternary ammonium chloride with an activity of 1.001 meq. wt./gm. was added under mild agitation. The mixture was stirred for 60 min while maintaining the Temperature at 80° C. After cooling the viscosity, solids content and pH are determined. The organophilic clay product contains 90 meq. wt. of quaternary ammonium compound/100 gm clay.

Examples 2 to 5 were prepared according to the procedures of Example 1, but with different quaternary ammonium compounds at different milliequivalents added as shown in table 1. The organophilic clays prepared above were then tested as thickeners in latex paint formulations.

To illustrate the effectiveness of one type of composition within the scope of this invention, various paint formulations (Formulation I to IV) were made and the thickening efficiency and application properties compared with commercially available thickeners. The results are given in Tables 2 to 5.

In the preparation of latex paints, a master batch was made according to the formulation excluding the thickener solution, then divided into small portions. To each portion, the calculated amount of thickener solution was added at low shear. The resulted paints were equilibrated and the properties determined.

TEST METHODS

A. Sag and leveling were done on leneta antisag bar and leneta leveling bar on leneta form 7B.

b Spatter resistance was measured by roller application of 70 g paint on 4 ft./4 ft. pressed board, 20 strokes over an area of 10 in./12 in. The spatter pattern is collected on a black cardboard paper. The result are rated numerically, the higher the number the better the spatter resistance.

c. Contrast ratio is determined by ACS computer system on a film of 3.0 wet mil. thickness. The higher the contrast ratio, the better the hiding power.

TABLE I

RAW MATERIALS AND COMPOSITIONS OF ORGANOCLAYS

| Product of Inv. | Conc of Clay Slurry % by wt | Activity of Quater Meq/gm | Structure Quaternary Ammonium | Meq wt of Quater | Wt or Quater gm | Conc of Organoclay. % by wt |
|---|---|---|---|---|---|---|
| Ex 1 | 6.3 | 1.001 | $R_1$ = Methyl $R_2$ = coco $X + Y = 15$ | 90 | 56.6 | 11.4 |
| Ex 2 | 6.8 | 0.303 | $R_1$ = methyl $R_2$ = H—Tallow $X + Y = 50$ | 30 | 67.3 | 11.0 |
| Ex 3 | 7.2 | 1.001 | $R_1$ = methyl $R_2$ = coco $X + Y = 15$ | 90 | 64.8 | 12.8 |
| Ex 4 | 6.7 | 0.303 | $R_1$ = methyl $R_2$ = H—Tallow $X + Y = 50$ | 30 | 66.5 | 11.9 |
| Ex 5 | 6.8 | 1.001 | $R_1$ = methyl $R_2$ = coco $X + Y = 15$ | 90 | 61.0 | 12.2 |

FORMULATION I
VINYL ACETATE LATEX PAINT

| | POUNDS | GALLONS |
|---|---|---|
| PIGMENT | | |
| water | 83.3 | 10.00 |
| Tamol 731 (25%) | 9.0 | 0.98 |
| Dowicil 75 | 2.0 | 0.16 |
| Foamaster NDW | 2.0 | 0.28 |
| Propylene Glycol | 50.0 | 5.81 |
| Ethylene Glycol | 15.0 | 1.61 |
| Butyl Carbitol | 18.0 | 2.11 |
| Triton 100 | 2.0 | 0.22 |

FORMULATION I
VINYL ACETATE LATEX PAINT

| | POUNDS | GALLONS |
|---|---|---|
| Ti-Pure R-900 | 200.0 | 6.08 |
| ASP - 200 | 60.0 | 2.79 |
| LET DOWN | | |
| water | 125.0 | 15.00 |
| UCAR 131 Vinyl Acetate Emulsion (60%) | 376.0 | 41.32 |
| Foamaster NDW Defoamer | 2.0 | 0.27 |
| Rheological Additive Soln | 103.7 | 12.39 |
| Total | 1048.0 | 99.02 |

Volume Sold = 32.6%
PVC = 27.3%

TABLE II
PROPERTIES OF VINYL ACETATE LATEX PAINT OF FORMULATION I

| | USE LEVEL LB/100 GAL | STORMER KU | RVT BROOKFIELD cps 0.5 rpm | LENETA SAG |
|---|---|---|---|---|
| HEC (ER - 4400) | 3.0 | 87 | 38,000 | 13 |
| HEC (ER - 4400) | 5.0 | 107 | 48,000 | 20 |
| RM-5 | 16.0 | 87 | 2,800 | 8 |
| QR-708 | 8.0 | 96 | 14,960 | 10 |
| Organoclay Exp II | 7.0 | 74 | 42,200 | 20 |
| Organoclay Exp I | 12.0 | 85 | 90,000 | 30 |

Paint Formulation I was used as an example, where Table II gives the application properties. This example demonstrates that organoclays of this invention can be made to equal the thickening efficiency of associative thickener.

FORMULATION II
VINYL ACRYLIC INTERIOR LATEX FLAT PAINT

| | WEIGHT LB | VOLUME GALLON |
|---|---|---|
| PIGMENT | | |
| Water | 120.0 | 14.40 |
| Tamol 960 (40%) | 10.0 | 0.94 |
| Ethylene Glycol | 25.0 | 2.69 |
| Dowicil 75 | 1.0 | 0.08 |
| PAG-188 | 2.0 | 0.25 |
| Attagel 50 | 5.0 | 0.25 |
| Ti-Pure R-900 | 200.0 | 5.84 |
| Optiwhite | 100.0 | 5.45 |
| Imsil A-15 | 75.0 | 3.40 |
| LET DOWN | | |
| Butyl Carbitol | 20.0 | 2.50 |
| Vinyl Acrylic Copolymer (55%) UCAR 367 | 350.0 | 38.68 |
| PAG-188 | 4.0 | 0.50 |
| Thickner Solution | 208.0 | 24.94 |
| Total | 1120.0 | 99.92 |

Volume Solid 35%
PVC 43%

TABLE III
PROPERTIES OF VINYL ACRYLIC INTERIOR LATEX FLAT OF FORMULATION II

| No. Description | Use Level lb./100 gal | Stormer Ku | RVT Brookfield cps, 0.5 rpm | Leneta SAG | Leneta Level |
|---|---|---|---|---|---|
| A HEC- (ER-4400) | 4.4 | 91 | 58,000 | 20 | 7 |
| B RM-5 | 12.0 | 85 | 47,000 | 16 | 8 |
| C QR-708 | 6.8 | 101 | 12,480 | 10 | 10 |
| D Organoclay Exp I | 12 | 95 | 72,000 | 18 | 5 |
| E Organoclay Exp II | 6 | 92 | 79,000 | 11 | 8 |
| F Organoclay Exp I QR-708 | 6 3 | 89 | 32,000 | 13 | 10 |

In paint Formulation II, the thickening efficiency of organoclay from Experiment I is equivalent to Acrysol RM-5 whereas organoclay from Experiment II is equivalent to QR-708 but somewhat less effective than HEC (ER-4400). It is generally accepted that associative thickeners offer excellent flow out properties but are relatively poor in sag control. It is shown here that the combined use of associative thickener QR-708 and organoclay can improve paint flow out and in the meantime, maintain proper sag control.

FORMULATION III
VINYL ACRYLIC LATEX PAINT

| INGREDIENTS | POUNDS | GALLONS |
|---|---|---|
| PIGMENT | | |
| water | 150.0 | 18.00 |
| Propylene Glycol | 40.0 | 4.63 |
| Filming Aid, Texanol | 10.0 | 1.26 |
| Antifoam, colloid 643 | 2.0 | 0.27 |
| Preservative, dowicil | 1.0 | 0.12 |
| TERGITOL Nonionic Surfactant NP-10 | 2.0 | 0.23 |
| Dispersant, Tamol 731 | 9.0 | 0.97 |
| Titanium Dioxide, Ti-pure R-901 | 220.0 | 6.77 |
| Calcium Carbonate | 40.0 | 1.78 |
| Clay, ASP 170 | 60.0 | 2.76 |
| LET DOWN | | |
| UCAR Latex 367 | 332.0 | 36.68 |
| Antifoam, Colloid 641 | 2.0 | 0.27 |
| Thickener Solution | 103.5 | 12.47 |
| TERGITOL NP-10 | 1.0 | 0.11 |
| TOTAL | 972.5 | 86.32 |
| PAINT PROPERTIES | | |
| Pigment Volume Concentration (PVC) | 35.5% | |
| Solids by Volume | 34.7% | |

TABLE IV
PROPERTIES OF VINYL ACRYLIC LATEX PAINT OF FORMULATION

| Rheological Additive | Use Level lb/100 gal | Stormer KU | Brookfield @ 0.5 rpm | Sag leneta | Leveling Leneta | Spatter resistance | Contrast Ratio |
|---|---|---|---|---|---|---|---|
| HEC | 4 | 95 | 62,000 | 25 | 1 | 1 | 0.908 |
| SCT-270 | 4.2 | 108 | 50,000 | 18 | 8 | 6 | 0.881 |
| QR-708 | 5.0 | 111 | 8,000 | 13 | 9 | 6 | 0.899 |
| RM-5 | 11.0 | 89 | 27,000 | 18 | 6 | 3 | 0.882 |
| ORGANOCLAY EXP. III | 12.0 | 98 | 81,000 | 14 | 1 | 2 | 0.912 |
| ORGANOCLAY EXP. IV | 7.0 | 115 | 100,000 | 30 | 1 | 2 | 0.898 |
| ORGANOCLAY EXP. IV QR-708 | 3.2 2.0 | 101 | 21,600 | 20 | 7 | 5 | 0.906 |
| ORGANOCLAY EXP IV SCT-270 | 3.4 2.0 | 91 | 43,000 | 25 | 5 | 4 | 0.916 |

Formulation III is a vinyl acrylic latex flat paint. In this formulation, organoclay from Experiment IV is much more efficient than Acrysol RM-5 but somewhat less efficient than other associative thickeners and HEC as shown in Table IV. When used alone, organoclay gives excellent sag control, leveling property is better than HEC, but not as good as associative thickeners. Compared to HEC, organoclay improves spatter resistance and gives good hiding. However, it should be mentioned that the hiding power of organoclay is superior to that of associative thickeners. The advantages of the combined use of organoclay and associative thickeners are further illustrated in this formulation—excellent sag control, improved spatter resistance and leveling while maintaining higher hiding power.

FORMULATION IV
INTERIOR FLAT WALL PAINT BASED ON
A VINYL ACRYLIC COPOLYMER

| MATERIALS | WEIGHT RATIO | PARTS PER HUNDRED (VOLUME BASIS) |
|---|---|---|
| Water | 120.0 | 14.40 |
| Tamol 960 (40%) | 10.0 | 0.84 |
| Ethylene Clycol | 25.0 | 2.69 |
| Dowicil 75 | 1.0 | 0.08 |
| Colloid 643 | 2.0 | 0.25 |
| Add the following at low speed: | | |
| Attagel 50 | 5.0 | 0.25 |
| Ti-Pure R-900 | 200.0 | 5.84 |
| Optiwhite | 100.0 | 5.45 |
| Min-u-sil 30 | 55.0 | 3.40 |
| | 20.0 | |
| Grind the above on a high speed impeller mill at 3800–4500 RPM for 20 minutes. At a slower speed let down as follows: | | |
| Butyl Carbitol | 20.0 | 2.50 |
| Vinyl Acrylic Copolymer (55%) Walpol 40-136 | 350.0 | 38.68 |
| Colloid 643 | 4.0 | 0.50 |
| Thickener Solution | 208.0 | |
| TOTAL | 1120.0 | 99.94 |
| FORMULATION CONSTANTS | | |
| PVC | | 43% |
| Volume Solids | | 35% |

TABLE V

PROPERTIES OF VINYL ACRYLIC INTERIOR FLAT LATEX PAINT OF FORMULATION IV

| Rheological Additive | Use Level lb/100 gal | Stormer KU | Brookfield @ 0.5 rpm | Sag leneta | Leveling leneta | Spatter resistance | Contrast Ratio |
|---|---|---|---|---|---|---|---|
| HEC | 4.4 | 99 | 91,000 | 60 | 1 | 1 | 0.863 |
| SCT-270 | 6.8 | 106 | 53,000 | 50 | 4 | 3 | 0.845 |
| QR-708 | 6.8 | 111 | | 40 | 9 | 4 | 0.842 |
| RM-5 | 13.0 | 87 | 46,800 | 50 | 7 | 4 | 0.863 |
| ORGANOCLAY EXP. IV | 7 | 100 | 175,000 | 60 | 2 | 2 | 0.863 |
| ORGANOCLAY EXP. V | 12 | 100 | 142,000 | 60 | 2 | 3 | 0.877 |
| ORGANOCLAY EXP. IV SCT-270 | 5 2 | 90 | 101,000 | 60 | 4 | | 0.871 |

Formulation IV and Table V give additional data to demonstrate the usefulness of organoclay as a rheological additive. The formulation is different from formulation II, yet similar application properties were obtained and the synergistic effects of organoclay with associative thickeners were again observed.

The present invention has been described in some detail by way of examples, it is understood that certain changes and modifications may be practiced within the scope of the invention, and such variations are not to be regarded as departure from the scope of the invention and all such modifications are intended to be included within the scope of the following claims.

The invention claimed is:

1. Organoclay composition comprising the reaction product of a smectite clay having an ion exchange capacity of at least 50 meq. wt. per 100 g clay (active basis), and an organic cationic compound having the following formula:

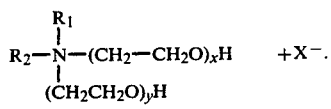

2. The organoclay composition of claim 1: wherein the anion, X-, is from the group consisting of chloride, bromide, iodide, acetate, sulfate, borate and phosphate.

3. An organoclay composition of claim 1, wherein the smectite type clay is selected from group consisting of hectorite and sodium bentonite.

4. An organoclay composition of claim 1, wherein the terminal polyoxyethylene group is capped by propylene oxide.

5. An organoclay composition of claim 1, wherein the polyoxyethylene chain is terminated by a group selected from the group consisting of sulfate, carboxylate, phosphate etc.

6. An organoclay composition of claim 1, wherein the said organic cation is from 5 meq. wt. to 150 meq. wt. per 100 g clay, 100% active basis.

7. A process for preparing organoclay composition of claim 1 comprising:
   a. preparing an aqueous slurry of 1 to 20%, by swight, of a smectite type clay having an ion exchange capacity of at least 50 meq. wt. per 100 g clay, 100% active basis,
   b. heating the clay slurry between 40° C. to 95° C.,
   c. adding to the clay slurry, 5 to 150 meq. wt. per 100 g clay of a quaternary ammonium compound of claim 1,
   d. reacting the mixture for a sufficient time to form a organoclay reaction product of the composition of claim 1.

8. An organoclay composition of claim 1, wherein the polyoxyethylene chain is terminated by reaction with an aromatic or alkyl mono isocyanate.

9. An organoclay composition of claim 1, wherein the polyoxyethylene chains are crosslinked by reaction with aromatic or alkyl diisocyanate.

10. An organoclay composition of claim 1 wherein the polyoxyethylene is branched.

* * * * *